(12) United States Patent
Murata et al.

(10) Patent No.: US 11,224,236 B2
(45) Date of Patent: Jan. 18, 2022

(54) METHOD FOR PRODUCING TEXTURED PROTEIN MATERIAL

(71) Applicant: NISSIN FOODS HOLDINGS CO., LTD., Osaka (JP)

(72) Inventors: Minori Murata, Osaka (JP); Kazuki Yoshida, Osaka (JP); Jiro Seto, Osaka (JP); Tomoko Nambu, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 16/082,455

(22) PCT Filed: Feb. 14, 2017

(86) PCT No.: PCT/JP2017/005294
§ 371 (c)(1),
(2) Date: Sep. 5, 2018

(87) PCT Pub. No.: WO2017/169207
PCT Pub. Date: Oct. 5, 2017

(65) Prior Publication Data
US 2019/0082716 A1 Mar. 21, 2019

(30) Foreign Application Priority Data

Mar. 28, 2016 (JP) .............................. JP2016-063718

(51) Int. Cl.
*A23J 3/16* (2006.01)
*A23J 3/18* (2006.01)
(Continued)

(52) U.S. Cl.
CPC . *A23J 3/16* (2013.01); *A23J 3/18* (2013.01); *A23J 3/227* (2013.01); *A23J 3/26* (2013.01);
(Continued)

(58) Field of Classification Search
CPC ........ A23J 3/16; A23J 3/18; A23J 3/26; A23J 3/227; A23J 3/22; A23J 3/225;
(Continued)

(56) References Cited

U.S. PATENT DOCUMENTS 1,976,751 A * 10/1934 Short ..................... A22C 9/004
452/142
2,223,466 A * 12/1940 Spang ..................... B26D 7/06
452/142
(Continued)

FOREIGN PATENT DOCUMENTS

CN 1144049 3/1997
CN 101455304 6/2009
(Continued)

OTHER PUBLICATIONS

International Search Report and Written Opinion of the ISA (Forms PCT/ISA/210 and PCT/ISA/237) issued in International Application No. PCT/JP2017/005294, dated Apr. 4, 2017, 11 pages with an English translation of the ISR.
(Continued)

*Primary Examiner* — Drew E Becker
*Assistant Examiner* — Bryan Kim
(74) *Attorney, Agent, or Firm* — Hamre, Schumann, Mueller & Larson, P.C.

(57) ABSTRACT

Problem to be Solved
An object of the present invention is to provide a method for producing a textured protein material having a meat-like fibrous texture.
Solution
The textured protein material having a meat-like fibrous texture can be produced by feeding a flat-sheet-like textured protein material prepared via pressurization and heating, and then extrusion by an extruder through cutting blade rolls
(Continued)

composed of a pair of rolls facing each other and having a plurality of square-blade-like annular blades arranged in parallel, thereby making slits sheared on the topside and the underside of the textured protein material in the same direction as the extruded direction.

2 Claims, 1 Drawing Sheet

(51) Int. Cl.
| | |
|---|---|
| *A23J 3/22* | (2006.01) |
| *A23J 3/26* | (2006.01) |
| *A23P 30/20* | (2016.01) |
| *A23L 5/10* | (2016.01) |
| *A23B 7/02* | (2006.01) |
| *A23L 3/40* | (2006.01) |

(52) U.S. Cl.
CPC ............. *A23P 30/20* (2016.08); *A23B 7/0205* (2013.01); *A23L 3/40* (2013.01); *A23L 5/13* (2016.08); *A23L 5/17* (2016.08); *A23V 2002/00* (2013.01); *A23V 2250/5486* (2013.01); *A23V 2250/5488* (2013.01); *A23V 2300/16* (2013.01); *A23V 2300/24* (2013.01)

(58) Field of Classification Search
CPC ........... A21C 3/02; A21C 3/021; A21C 3/024; A21C 3/028; A21C 11/02; A21C 11/06; A21C 11/04; A21C 11/12; A23P 10/00; A23P 30/00; A23P 30/10; A23P 30/20; A23P 30/25; A23L 13/70; A23L 11/05; A23L 11/07; A23L 19/09; A22C 9/00; A22C 9/008; B26D 3/08; B26D 3/085; B26D 2210/02; B26D 2210/04
USPC .......... 83/863, 865, 875–877, 879, 885–887, 83/932; 426/144, 518
See application file for complete search history.

(56) References Cited

U.S. PATENT DOCUMENTS

| | | | | |
|---|---|---|---|---|
| 2,243,492 A * | 5/1941 | Wilson | ................... | A22C 9/004 |
| | | | | 452/142 |
| 2,420,549 A * | 5/1947 | McKee | ................... | A22C 9/004 |
| | | | | 452/142 |
| 3,962,751 A * | 6/1976 | Wagner | ................... | A22C 9/004 |
| | | | | 452/142 |
| 4,313,963 A * | 2/1982 | Greenspan | ............... | A23L 13/72 |
| | | | | 426/264 |
| 5,145,453 A * | 9/1992 | Anderson | ............... | A22C 9/004 |
| | | | | 452/142 |
| 5,234,705 A * | 8/1993 | Mani | ....................... | A21C 11/12 |
| | | | | 426/138 |
| 5,738,578 A * | 4/1998 | Marchese | .............. | A22C 9/008 |
| | | | | 452/142 |
| 6,257,132 B1 * | 7/2001 | Bifulco | .................. | A22C 9/004 |
| | | | | 100/161 |
| 6,379,738 B1 | 4/2002 | Dingman et al. | | |
| 6,902,754 B1 * | 6/2005 | Evans | ..................... | A21C 11/04 |
| | | | | 426/503 |
| 7,736,686 B2 * | 6/2010 | Dingman | ............... | A23K 10/20 |
| | | | | 426/646 |
| 8,764,523 B2 * | 7/2014 | Ludwig | ................... | B02C 25/00 |
| | | | | 452/142 |
| 9,314,045 B2 * | 4/2016 | Nishimura | ................ | A23J 3/16 |
| 9,351,497 B1 * | 5/2016 | Parkman | ................. | A22C 9/008 |
| 9,380,791 B2 * | 7/2016 | Borkiewicz | ............ | A22C 9/008 |
| 10,477,882 B1 * | 11/2019 | Wang | .................... | A23L 1/3055 |
| 2002/0106442 A1 | 8/2002 | Dingman et al. | | |
| 2004/0086602 A1 * | 5/2004 | Oka | ........................ | A21C 11/12 |
| | | | | 426/76 |
| 2007/0128340 A1 * | 6/2007 | Andrews | ................... | A21D 2/26 |
| | | | | 426/656 |
| 2007/0148323 A1 | 6/2007 | Dingman et al. | | |
| 2009/0155448 A1 | 6/2009 | Solorio et al. | | |
| 2009/0208612 A1 * | 8/2009 | Reiser | ................... | A23L 13/426 |
| | | | | 426/104 |
| 2014/0127363 A1 * | 5/2014 | Giezen | ...................... | A23J 3/16 |
| | | | | 426/104 |
| 2015/0289542 A1 * | 10/2015 | den Dulk | .................. | A23J 3/14 |
| | | | | 426/615 |
| 2015/0296834 A1 * | 10/2015 | Geistlinger | ............. | A23J 3/227 |
| | | | | 426/657 |
| 2016/0205986 A1 * | 7/2016 | Walther | ..................... | A23J 3/26 |
| 2016/0229075 A1 * | 8/2016 | Fastabend | .............. | B26D 3/185 |
| 2018/0077950 A1 * | 3/2018 | Heck | ........................ | A23P 30/20 |

FOREIGN PATENT DOCUMENTS

| | | |
|---|---|---|
| CN | 201345888 Y | 11/2009 |
| CN | 102697063 | 10/2012 |
| CN | 104273461 | 1/2015 |
| JP | 54-027888 | 9/1979 |
| JP | 58-001905 | 1/1983 |
| JP | 4-005413 | 1/1992 |

OTHER PUBLICATIONS

International Preliminary Report on Patentability (Form PCT/IPEA/409) issued in International Application No. PCT/JP2017/005294, dated Dec. 6, 2017, 5 pages.

Riaz, et al., "Texturized soy protein as an ingredient", Proteins in Food Processing, Jan. 1, 2004, pp. 517-558, XP009188612.

Extended European Search Report issued in corresponding European Application No. 17773755.8, dated Jul. 19, 2019, 7 pages.

Office Action issued in corresponding Chinese Patent Application No. 201780029280.0, dated Mar. 25, 2019, 14 pages with translation.

Office Action issued in Chinese Patent Application No. 201780029280.0, dated Oct. 8, 2019, 13 pages including English translation.

Office Action issued for the corresponding Brazilian Patent Application No. BR112018069815-6, dated Oct. 18, 2021, 8 pages including English translation.

* cited by examiner

[Figure 1]
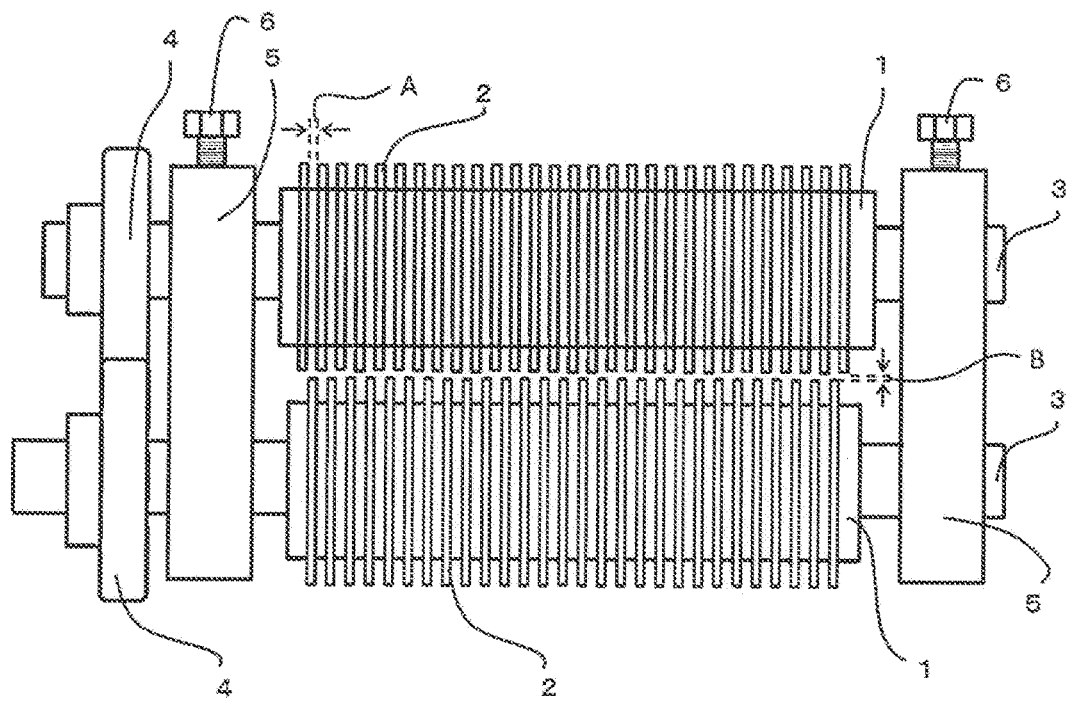
[Figure 2]
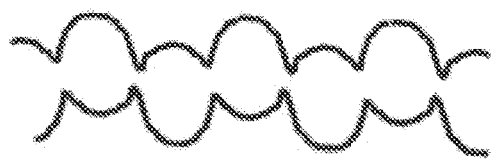
SQUARE BLADE
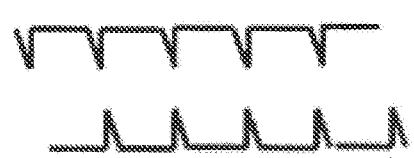
KNIFE BLADE

METHOD FOR PRODUCING TEXTURED PROTEIN MATERIAL

TECHNICAL FIELD

The present invention relates to a method for producing a textured protein material.

BACKGROUND ART

Conventionally, it has been proposed to produce a meat-like protein processed food product as a meat substitute from a textured protein material prepared by extruding powder mainly composed of plant protein such as soybean protein or wheat protein using an extruder.

However, the extruded and prepared textured protein material itself does not have a meat-like fibrous texture, and thus the protein material is subjected to various treatments to impart a fibrous texture (for example, Patent Literatures 1 and 2).

Patent Literature 1 describes technology using defibration rolls, which involves, breaking down a softened oriented sheet-like product or a softened bar-like product obtained by extrusion into thin fibrous pieces through defibration rolls having a line of many file teeth similar to a sheet cutter or having brush-like needles on the surface. However, in a method using defibration rolls, a textured protein material is broken down into thin fibrous pieces, and thus these pieces cannot be directly used as meat-like protein processed food products, and need to be mixed with meat or broken-down fibrous pieces need to be molded again.

Patent Literature 2 describes technology using rolls; that is, a method for producing a protein food product material having tissue, appearance, and texture analogous to natural meats when reconstituted with water or hot water, which comprises feeding a textured protein material through two or more rolls differing in peripheral speed, and then applying shearing stress resulting from the peripheral speed difference to the textured protein material. However, this technology had a challenge that since the textured protein material is entirely crushed, meat-like elasticity can be obtained, but the product lacks a fibrous texture.

CITATION LIST

Patent Literature

Patent Literature 1: Japanese Patent Publication No. S54-27888
Patent Literature 2: Japanese Patent Publication No. H4-5413

SUMMARY OF INVENTION

Technical Problem

An object of the present invention is to provide a method for producing a textured protein material having a meat-like fibrous texture.

Solution to Problem

The present inventors have discovered that a textured protein material having a meat-like fibrous texture can be produced not by subjecting the textured protein material to a generally performed treatment using rolls, but by feeding the textured protein material through a pair of rolls, which are referred to as cutting blade rolls for use in cutting of noodles or the like, that face each other, and have a plurality of square-blade-like annular blades arranged in parallel, thereby making slits sheared on the topside and the underside of the textured protein material, and thus completed the present invention.

Specifically, it is a method for producing a textured protein material that includes feeding a flat-sheet-like textured protein material prepared via pressurization and heating and then extrusion by an extruder through cutting blade rolls composed of a pair of rolls facing each other and having a plurality of square-blade-like annular blades arranged in parallel, thereby making slits sheared on the topside and the underside of the textured protein material in the same direction as the extrusion direction.

Further, the cutting blade rolls in the present invention have a pitch width of the adjacent annular blades preferably ranging from 0.8 to 1.5 mm, and a clearance width between the pair of rolls is preferably 10 to 30% relative to a thickness of the textured protein material when the textured protein material is fed therethrough.

Furthermore, a textured protein material prepared in the present invention is seasoned, and then dried, so that a meat-like dry protein processed food product can be produced as an ingredient for an instant food product.

Advantageous Effects of Invention

According to the present invention, a method for producing a textured protein material having a meat-like fibrous texture can be provided.

BRIEF DESCRIPTION OF DRAWINGS

FIG. 1 is a schematic diagram of cutting blade rolls (square blades) according to the embodiments of the present invention.

FIG. 2 shows image diagrams of the cross sections of a textured protein material when slits are made on the textured protein material using cutting blade rolls having square blades and knife blades.

REFERENCE SIGNS LIST

1 Roll
2 Annular blade (square blade)
3 Roll shaft
4 Gear
5 Case
6 Clearance adjusting screw
A Pitch
B Clearance

DESCRIPTION OF EMBODIMENTS

Hereafter, the present invention will be described specifically, but the present invention is not limited to the following descriptions.

1. Preparation of Textured Protein Material

The textured protein material according to the present invention is prepared by kneading a plant-derived powder material such as defatted soybean powder, soybean protein powder, wheat protein powder and starch, with water, and then extruding the mixture using a biaxial extruder through a die under high temperature and high pressure into an environment under ordinary pressure. At this time, the textured protein material is exposed to ordinary pressure immediately after being exposed to high pressure, so as to have a porous structure. Also, various sheet-like textured protein materials can be obtained by varying the die shape. The thickness of a sheet-like textured protein is preferably 10 mm or less, and is more preferably adjusted to range from about 2 to 5 mm. The thus obtained textured protein material may be cut into pieces having appropriate lengths and then directly used, or can be stored for a long time period through drying or freezing of the material. Moreover, the extruded sheet-like textured protein material may be directly subjected to treatment with cutting blade rolls as described later, cut into pieces having appropriate lengths, and then directly used, or dried or frozen and then used.

The thus prepared textured protein material is dipped in water, and then reconstituted with water. A method for reconstitution with water is not particularly limited, and an about overnight dipping in water allows moisture to extend throughout the textured protein material, resulting in the tissue with appropriate elasticity. Subsequently, the textured protein material reconstituted with water is dewatered to remove unnecessary moisture. Through dewatering, not only can unnecessary components be removed, but also odors including soybean odor and wheat protein odor can be reduced. Further, when treatment with cutting blade rolls described later is performed in advance, reconstitution with water is performed, dewatering is performed, and then the resultant material can be used as a textured protein material.

2. Treatment with Cutting Blade Rolls

Subsequently, slits are made on the dewatered textured protein material by shearing using cutting blade rolls. Slits are made so that the textured protein material has fibrous properties and fibrous orientation, and thus has a more meat-like texture. Moreover, since the material undergoes this step, when a meat-like dry protein processed food product for an instant food product is produced, the textured protein material is easily seasoned evenly and the reconstitutability upon eating is also improved.

When slits are made on the textured protein material using cutting blade rolls, the material is preferably fed through the cutting blade rolls, so that the slits are made in the same direction as the direction of the textured protein material extruded by a biaxial extruder. A case in which the material is fed through the cutting blade rolls, in such a manner that slits are made in a direction perpendicular to the extruded direction is not preferred since the fiber alignment is disrupted.

The cutting blade rolls according to the present invention are composed of a pair of rolls 1 facing each other and having a plurality of annular blades 2 arranged in parallel, as shown in FIG. 1. The pair of rolls 1 are disposed in parallel so that a roll shaft 3 penetrates through a case 5. The pair of rolls 1 are interlocked with rotation driven by an actuator, and are then rotated by a gear 4 with the roll shaft 3 as an axis.

As shown in FIG. 1, the annular blades 2 have flat sides referred to as square blades and pointed right-angled corners on both sides. As shown in FIG. 2, slits are made on both surfaces of the textured protein material while shearing with the cutting blade rolls having many annular blades (square blades) 2, so that the slits are rough and easily fixed, and rough pits and projections are formed on the surfaces of the textured protein material, creating a natural meat-like fibrous texture to be felt. In contrast, when annular blades (e.g., knife blades) with sharp ends as shown in FIG. 2 are used, the slits are sharp and may be closed by some of the subsequent processing, and, pits and projections formed on the surfaces are difficult to be felt and a meat-like fibrous texture is not easily imparted.

Further, pitch A that is the space between annular blades (square blades) 2 ranges from preferably 0.8 mm to 1.5 mm. If the space is narrower than a 0.8-mm pitch, the surface of noodle strings becomes excessively rough and cracks are easily formed. Conversely, when the space is wider than a 1.5-mm pitch, the fibrous texture is decreased.

Furthermore, clearance B that is the space between the ends of the annular blades (square blades) 2 attached to the pair of rolls 1 is preferably 10 to 30% relative to the thickness of the textured protein material, depending on the thickness of the textured protein material, when the thickness of the textured protein material ranges from about 3 to 10 mm. If the space is narrower than 10%, excessively deep slits are made on the textured protein material, and the meat is crumbled. In contrast, when the space is wider than 30%, slits cannot be easily made and the fibrous texture is decreased. Clearance B can be adjusted by varying the degree of tightening of the adjusting screw 6.

3. Others

The textured protein material with slits made thereon may be, after seasoning, baked or boiled, so as to produce a meat-like protein processed food product, or may be, after seasoning, dried, and then reconstituted with hot water, so as to produce a meat-like dry protein processed food product to be used as an ingredient of an instant food product to be cooked by pot cooking or microwave cooking.

A specific method of production of a method for producing a meat-like dry protein processed food product to be used as an ingredient for an instant food product comprises adding soy sauce, sugar, salt, sweetened sake, liquor, sodium glutamate, protein hydrolysate, livestock meat extract, squeezed juice or powder of ginger or onion, etc., spices, flavors, pigments, and the like to the textured protein material with slits made thereon, mixing the mixture, or, dipping the material in a seasoning liquid containing these raw materials dissolved therein or boiling down in the seasoning liquid for seasoning, and then adding, if necessary, an edible fat or oil such as sesame oil, palm oil, lard, beef tallow, and performing hot-air drying, microwave drying or freeze drying, or, fry drying without adding any edible fat or oil, so as to produce a meat-like dry protein processed food product.

More preferably, hot-air drying is preferred in that this is inexpensive and can control the texture. An edible fat or oil is added to the seasoned textured protein material so that the fat or oil content after drying ranges from 10 to 20 wt %, more preferably ranges from 12 to 16 wt %, and then the material is preferably dried with hot air at 100 to 120° C., more preferably at 105° C. to 115° C., until the moisture ranges from 5 to 12 wt %, more preferably from 6 to 10 wt %.

As described above, a flat-sheet-like textured protein material prepared by pressurization and heating, and then extruded by an extruder is fed through cutting blade rolls composed of a pair of rolls facing each other and having a plurality of square-blade-like annular blades arranged in parallel, so as to make slits sheared on the topside and the underside of the textured protein material in the same direction as the extruded direction, and thus the textured protein material having a meat-like fibrous texture can be produced.

The embodiments will now be described in greater detail by way of Examples as follows.

EXAMPLES

Example 1

Raw material powder comprising 80 wt % of defatted soybean, 10 wt % of separated soybean protein, 9.6 wt % of corn starch, and 0.4 wt % of calcium sulfate was mixed, water was added to the mixture such that the content of water was 5 wt % relative to the weight of the raw material powder, 1.5 wt % of saturated steam was poured into the mixture relative to the weight of the raw material powder while kneading the mixture, and then the resultant was extruded using a biaxial extruder under warming and pressurization conditions of 110° C. and 3.5 Maps through a slit die having a 1 mm thick and 30 mm wide outlet port, thereby preparing a flat-sheet-like textured protein material.

The thus prepared textured protein material was cut such that the length was about 25 mm, and then dried by hot air at 60° C., such that the moisture content was 8 wt %.

The dried textured protein material was soaked in water overnight for reconstitution with water, and then dewatered. The 3 to 4-mm-thick dewatered textured protein material was fed through square-blade-like cutting blade rolls with a 0 8-mm pitch as shown in FIG. 1, which had been adjusted to have a clearance between the top and the bottom rolls of 0.5 mm, so as to make slits in the extruded direction, and to achieve fiber alignment on the textured protein material.

The textured protein material that had been fed through the cutting blade rolls was dipped in a seasoning liquid comprising 20 wt % of soy sauce, 35 wt % of sugar, 5 wt % of salt, 2 wt % of caramel pigment, and 38 wt % of water, and then heated until boiling. After boiling, heat was turned off, the material was left to stand for 5 minutes, and then subjected to liquid draining and then to seasoning.

Next, the textured protein material was placed in a mixer, beef tallow (melting point: 40° C.) warmed and melted at 50° C. in an amount of 20 wt % relative to the weight of the seasoned textured protein material was placed therein, the mixture was homogeneously mixed, and then the textured protein material was taken out.

Next, the textured protein material to which the beef tallow was added was heated and dried using a hot-air drier at 110° C. until the moisture content was 8 wt %, and then cooled, thereby preparing a meat-like dry protein processed food product sample (fat or oil content of 14 wt %). Note that, fats or oils were measured by the ether extraction method as described in the Food Labeling Standards Attachment (Methods for Analysis of Nutrients, etc., 2 Lipid (1)). Moreover, moisture was measured by the normal-pressure heat-drying method described in the Food Labeling Standards Attachment (Methods for Analysis of Nutrients, etc., 5 Carbohydrate, (i) Moisture (3)). Heating was performed at a temperature of 105° C. for 4 hours.

Example 2

A meat-like dry protein processed food product sample was produced according to the method of Example 1 except that the pitch width of the cutting blade rolls was 0.6 mm.

Example 3

A meat-like dry protein processed food product sample was produced according to the method of Example 1 except that the pitch width of the cutting blade rolls was 1.2 mm.

Example 4

A meat-like dry protein processed food product sample was produced according to the method of Example 1 except that the pitch width of the cutting blade rolls was 1.5 mm.

Example 5

A meat-like dry protein processed food product sample was produced according to the method of Example 1 except that the clearance width of the cutting blade rolls was 0.4 mm.

Example 6

A meat-like dry protein processed food product sample was produced according to the method of Example 1 except that the clearance width of the cutting blade rolls was 0.6 mm.

Example 7

A meat-like dry protein processed food product sample was produced according to the method of Example 1 except that the clearance width of the cutting blade rolls was 0.8 mm.

Comparative Example 1

A meat-like dry protein processed food product sample was produced according to the method of Example 1 except that the annular blades of the cutting blade rolls were replaced by pointed sharp-edged blades.

Comparative Example 2

A meat-like dry protein processed food product sample was produced according to the method of Example 1 except that slits were made so as to be perpendicular to the extrusion direction.

Comparative Example 3

A meat-like dry protein processed food product sample was produced according to the method of Example 1 except that one of the cutting blade rolls was replaced by a flat roll with no annular blade and slits were made on only one side of the product sample.

Comparative Example 4

A meat-like dry protein processed food product sample was produced according to the method of Example 1 except that both of two cutting blade rolls were replaced by flat rolls with no annular blade, the number of gear teeth was changed so that the ratio of the rotation speed of one roll and that of the other roll was 5:3, and the sample product was pressed and flattened without making any slit thereon.

Comparative Example 5

A meat-like dry protein processed food product sample was produced according to the method of Example 1 except that the pitch width of the cutting blade rolls was 0.4 mm.

Comparative Example 6

A meat-like dry protein processed food product sample was produced according to the method of Example 1 except that the pitch width of the cutting blade rolls was 2.5 mm.

Comparative Example 7

A meat-like dry protein processed food product sample was produced according to the method of Example 1 except that the clearance width of the cutting blade rolls was 0.2 mm.

Comparative Example 8

A meat-like dry protein processed food product sample was produced according to the method of Example 1 except that the clearance width of the cutting blade rolls was 1.0 mm.

Furthermore, the prepared meat-like dry protein processed food products were assessed. Assessment was made for the meat-like fibrous texture after cooking by pouring hot water and cracks of meat-like dry protein processed food products during production. Regarding the assessment method, the meat-like fibrous texture was assessed on a scale of 1 to 4, and pieces of meat during production were assessed for cracks on a scale of 1 to 3, by five skilled panelists. Cooking with hot water was performed by placing 10 meat-like dry protein processed products in cup containers, and adding 400 ml each of previously prepared hot water to the containers for 3 minutes of reconstitution.

For the assessment of the meat-like fibrous texture after cooking with hot water, a sample having a very good meat-like fibrous texture was defined as Excellent, a sample having a good meat-like fibrous texture was defined as Good, a sample having a weak meat-like fibrous texture was defined as Fair, and a sample having no meat-like fibrous texture was defined as Poor.

For the assessment of cracks of the meat-like dry protein processed food products during production, a sample with almost no crack was defined as Good, a sample with many cracks was defined as Fair, and a sample almost having lost its original shape was defined as Poor.

Table 1 shows the results of assessing test samples.

TABLE 1

| Test group | Cutting blade | Slit direction relative to extrusion direction | Pitch width (mm) | Clearance width (mm) | Crack during production | Meat-like fibrous texture | Comment |
|---|---|---|---|---|---|---|---|
| Example 1 | Square blade | Parallel | 0.8 | 0.5 | Good | Excellent | Very good fibrous texture |
| Example 2 | Square blade | Parallel | 0.6 | 0.5 | Good | Good | Good fibrous texture with somewhat rough surface |
| Example 3 | Square blade | Parallel | 1.2 | 0.5 | Good | Excellent | Very good fibrous texture |
| Example 4 | Square blade | Parallel | 1.5 | 0.5 | Good | Good | Good fibrous texture |
| Example 5 | Square blade | Parallel | 0.8 | 0.4 | Good | Excellent | Good with appropriate fibrous texture |
| Example 6 | Square blade | Parallel | 0.8 | 0.6 | Good | Excellent | Very good fibrous texture |
| Example 7 | Square blade | Parallel | 0.8 | 0.8 | Good | Good | Shallow slits, barely good fibrous texture |
| Comparative Example 1 | Knife blade | Parallel | 0.8 | 0.5 | Good | Fair | Poor fibrous texture compared to square blade |
| Comparative Example 2 | Square blade | Perpendicular | 0.8 | 0.5 | Good | Poor | No fibrous texture |
| Comparative Example 3 | Square blade (single side) | Parallel | 0.8 | 0.5 | Good | Fair | Poor fibrous texture compared to a case with double blades |
| Comparative Example 4 | Roll (no blade) | Parallel | N/A | 0.5 | Good | Fair | With meat-like elasticity, but poor fibrous texture |
| Comparative Example 5 | Square blade | Parallel | 0.4 | 0.5 | Fair | Poor | Cracks formed during production |
| Comparative Example 6 | Square blade | Parallel | 2.5 | 0.5 | Good | Poor | Excessively wide space between slits, no fibrous texture felt |
| Comparative Example 7 | Square blade | Parallel | 0.8 | 0.2 | Poor | Poor | Cracks formed during production, almost entirely cracked so that the sample was unable to keep its original shape |
| Comparative Example 8 | Square blade | Parallel | 0.8 | 1.0 | Good | Poor | Almost no slits were made and no fibrous texture |

The invention claimed is:

1. A method for producing a textured protein material, comprising:
   forming by an extruder, a sheet-shaped protein material having a porous structure prepared via pressurization and heating; and
   then treating the sheet-shaped protein material by an apparatus comprising cutting blade rolls, wherein the apparatus comprises a pair of the cutting blade rolls facing each other,
   thereby
   making slits sheared on a top surface and an under surface of the sheet-shaped protein material in the same direction as an extruded direction thereof, so that the textured protein material in a sheet shape is formed,
   wherein each of the pair of the cutting blade rolls comprises a plurality of annular blades arranged in parallel to each other,
   a pitch width between adjacent annular blades of the cutting blade rolls ranges from 0.8 to 1.5 mm,
   a clearance width between ends of the annular blades of the pair of rolls is in a range from 10 to 30% relative to a thickness of the sheet-shaped protein material formed by the extruder, the thickness of the sheet-shaped protein material formed by the extruder being in a range from 2 to 5 mm,
   each of the plurality of annular blades comprises a square blade that has a flat surface with opposing sides, a pointed corner at each of the opposing sides of the flat surface, and each pointed corner has an angle of 90° between the flat surface and the annular blade,
   the slits are pits and projections formed on the top surface and the under surface of the sheet-shaped protein material by press-cutting the top surface and the under surface thereof with the plurality of annular blades, and
   protein in the textured protein material consists of plant protein.

2. A method for producing a meat-substituting dry protein processed food product for an instant food product, comprising producing the textured protein material by the method according to claim 1, and seasoning and drying the textured protein material.

\* \* \* \* \*